United States Patent [19]

Nakaya et al.

[11] Patent Number: 4,516,599
[45] Date of Patent: May 14, 1985

[54] VALVE MECHANISM FOR LOW TEMPERATURE APPLICATIONS

[75] Inventors: Shyunichi Nakaya, Kawasaki; Hiroyuki Nakamura, Yokohama, both of Japan

[73] Assignee: Tokyo Shibaura Denki Kabushiki Kaisha, Kanagawa, Japan

[21] Appl. No.: 351,509

[22] Filed: Feb. 23, 1982

[30] Foreign Application Priority Data

Feb. 27, 1981 [JP] Japan ................................. 56-28213

[51] Int. Cl.³ ............................................... F16L 7/00
[52] U.S. Cl. .................................... 137/375; 137/522; 137/540; 251/61.2; 92/49
[58] Field of Search ..................... 137/375, 522, 540; 251/61.3, 61.2, 61.5; 92/98 D, 98 R, 49

[56] References Cited

U.S. PATENT DOCUMENTS

| 2,456,165 | 12/1948 | Yuza | 251/144 |
|---|---|---|---|
| 3,100,399 | 8/1963 | Robins | 137/85 |
| 3,143,134 | 8/1964 | Karpis | 92/49 |
| 3,195,564 | 7/1965 | Carney et al. | 137/375 |
| 3,339,888 | 9/1967 | Dumm | 251/367 |
| 3,358,463 | 12/1967 | Hawkins et al. | 62/45 |
| 4,442,859 | 4/1984 | Gentry | 137/522 |

FOREIGN PATENT DOCUMENTS

| 2312103 | 9/1973 | Fed. Rep. of Germany . | |
| 1070395 | 7/1954 | France . | |
| 1249396 | 3/1961 | France . | |
| 875335 | 8/1961 | United Kingdom . | |
| 2043831 | 10/1980 | United Kingdom | 92/98 D |

OTHER PUBLICATIONS

Francois et al.—"Control of Pressurized Superfluid Helium-II: Application to Loss Analysis" Advances in Cryogenic Engineering, vol. 25.
Vander Arend et al.—"A Large-Scale Pumped and Subcooled Liquid . . . ", Advances in Cryogenic Engineering, vol. 21, (1977).

Primary Examiner—Martin P. Schwadron
Assistant Examiner—Sheri Novack
Attorney, Agent, or Firm—Schwartz, Jeffery, Schwaab, Mack, Blumenthal & Koch

[57] ABSTRACT

A valve mechanism for low temperature applications comprising an outlet for a low temperature fluid, valve means for opening and closing said outlet, an axially movable rod having one end secured to said valve means and the other end extending outwardly to a normal temperature zone, means for holding said rod, resilient means located in said normal temperature zone for urging said rod toward a position wherein said outlet is closed by said valve means, and means for selectively applying a pressurized fluid to said rod to exert a force counter to said resilient means, whereby said rod and valve means may be displaced and said outlet opened.

15 Claims, 3 Drawing Figures

VALVE MECHANISM FOR LOW TEMPERATURE APPLICATIONS

BACKGROUND OF THE INVENTION

The present invention relates to a valve mechanism for low temperature applications, and more particularly to an improved valve mechanism suitable for use at cryogenic temperatures.

A spring type safety valve is conventionally used on pressure vessels such as boilers and compressed air tanks to prevent failure of the vessels due to excessively high pressure therein. However, no safety valves particularly designed for use at cryogenic temperatures, for example in a cryostat, are available. Consequently, conventional spring type safety valves are normally used on pressure vessels such as liquid helium vessels and others which are used under cryogenic temperatures.

However, use of conventional safety valves designed for normal temperatures at cryogenic temperatures has inevitably involved the following troubles. First, the seal members of the conventional valves deteriorate at cryogenic temperatures and soon malfunction. Second, the elasticity of a spring fluctuates at cryogenic temperatures, making it difficult to specify both set pressure and reset pressure correctly. There is also a need for a safety valve which can be selectively retained in an open state in addition to working as a normal safety valve.

A conventional cryostat for a super-conducting magnet has both a safety valve and an ordinary valve for opening and closing its outlet. Problems have been encountered concerning maintenance of such valves and concerning the heat loss through the valves. Particularly, in a cryostat for a magnetic floating train system, it is necessary to facilitate and expedite the maintenance of the valves to provide for the public convenience and safety.

SUMMARY OF THE INVENTION

Accordingly, it is an object of the present invention to provide a new and improved valve mechanism for low temperature applications which functions both as a safety valve and as an ordinary valve.

Another object of the invention is to provide a valve mechanism for low temperature applications suitable for use at cryogenic temperatures.

A further object of the invention is to provide a valve mechanism for low temperature applications which will prevent failure of low temperature fluid tanks due to excessively high pressures therein.

Still another object of the invention is to provide a valve mechanism for low temperature applications capable of being selectively retained in an open state and used as an ordinary valve.

It is also an object of the invention to provide a valve mechanism for low temperature applications which facilitates maintenance operations and minimizes the space required for installation.

These and other objects are achieved by providing a valve mechanism for low temperature applications comprising an outlet for a low temperature fluid; valve means for opening and closing the outlet; an axially movable rod having one end secured to the valve means and the other end extending to a normal temperature zone; means for holding the rod; resilient means located in the normal temperature zone for urging the rod toward a position wherein the outlet is closed by the valve means; and means for selectively applying a pressurized fluid to said rod to exert a force counter to said resilient means to displace the rod and valve means and open the outlet.

BRIEF DESCRIPTION OF THE DRAWINGS

The invention will be described in further detail with reference to the accompanying drawings, wherein like reference characters denote like parts in the various views.

DETAILED DESCRIPTION OF PREFERRED EMBODIMENTS

Figure 1:
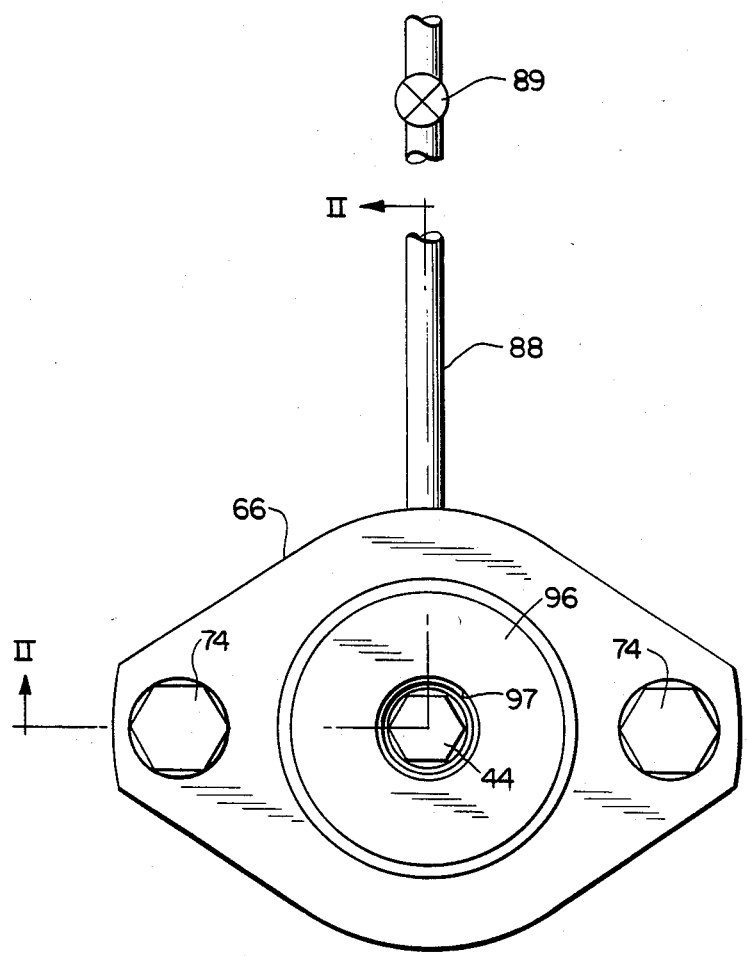
FIG. 1 is a schematic plan view of a preferred embodiment of the valve of the invention.

Reference numeral 10 denotes the top wall of an outer shell 12 surrounding a tank 14 for a low temperature liquid, such as liquid helium. The space between outer shell 12 and tank 14 is evacuated to prevent heat transfer between the tank and the outer shell. An opening 18 is provided through top wall 10, and a rod 20 is inserted through opening 18 into outer shell 12. Rod 20 is formed by axially joining columnar first, second and third rod portions 22, 24 and 26, respectively, and a tube 28, connected in that order. The first rod portion 22, which is disposed at the top of rod 20, has its upper end 30 narrowed to a small diameter and an axial bore 32 through the center thereof. The second rod portion 24 generally has a smaller diameter than first rod portion 22 except the upper end 34 has a larger diameter part provided with a recess 36 adapted to matingly receive the lower end of the first rod portion 22. Second rod portion 24 also has an axial bore 37 through the center thereof. The third rod portion 26 has a diameter almost same as the small diameter part of second rod portion 24 except the upper end 38 of third rod portion 26 is slightly enlarged and is provided with a recess 40 for matingly receiving the lower end of second rod portion 24. An axial blind bore 41 provided with inside threads 42 extends part way through the center of third rod portion 26. First, second and third rod portions 22, 24 and 26 are joined by means of a bolt 44 extended through bores 32 and 37 to engage threads 42 in blind bore 41. The central portions of flexible partitions 82 and 78, described hereinafter, are sandwiched between the first rod portion 22 and the recess 36 at upper end 34 of the second rod portion 24, and between the second rod portion 24 and the recess 40 at the upper end 38 of the third rod portion 26, respectively.

The tube 28 has substantially the same outer diameter as the third rod portion 26. The upper end 48 of tube 28 is sealingly connected to the lower end of third rod portion 26, and the lower end 50 of tube 28 is sealingly connected to valve means such as valve plug 52. The interior of tube 28 is preferably evacuated to reduce heat transfer between plug 52 and rod portion 26. Valve plug 52 is disposed in a valve chest 54. Valve chest 54 is mounted on tank 14 in communication with the tank outlet 56 and in communication with a gas discharge passage 58. Valve plug 52 confronts a valve seat 60 formed at the connection between valve chest 54 and tank outlet 56. Outlet 56 is closed when the valve plug 52 engages valve seat 60, and is opened when the valve plug 52 moves away from the valve seat, whereby gas from tank 14 may exit through valve chest 54 and gas discharge passage 58. A rod holding means 61 is mounted on the outside of top wall 10 of outer shell 12. Rod holding means 61 comprises first, second and third holding members 62, 64 and 66 having aligned axial bores 68, 70 and 72, respectively, through which rod 20 is extended. Holding members 62, 64 and 66 are stacked in the recited order on the outside of top wall 10 and secured to each other and to the top wall by means of bolts 74.

The outer sealing periphery 76 of the first flexible partition or diaphragm 78 is sandwiched between the first and second holding members 62 and 64. The center of the diaphragm 78 is sandwiched between the second rod portion 24 and the recess 40 at the upper end 38 of the third rod portion 26, thereby sealing the valve chest 54 from the atmosphere. The outer sealing periphery 80 of the second flexible partition or diaphragm 82 is sandwiched between the second and third holding members 64 and 66, and the center of the diaphragm 82 is sandwiched between the first rod portion 22 and the recess 36 at the upper end 34 of second rod portion 24.

A gas-tight pressure chamber 84 is formed by the inner surface of the bore 70 through second holding member 64, the outer surface of the second rod portion 24, the upper surface of the first diaphragm 78, and the lower surface of the second draphragm 82. Pressure chamber 84 has a sectional area orthogonal to the axis of rod 20 which is widened at the upper side or normal temperature zone side and is narrowed at the lower side or low temperature zone side. Consequently, bore 70, i.e., pressure chamber 84, has a larger diameter upper part 70A sealed by the diaphragm 82 and a smaller diameter lower part 70B sealed by the diaphragm 78. Holding member 64 is radially penetrated by a high pressure gas passage 86 opening into the larger diameter part 70A of chamber 84. Gas passage 86 is connected to an inlet pipe 88 to introduce a pressurized gas, such as compressed air, into the pressure chamber 84. A control valve 89 is provided on inlet pipe 88 for regulating the flow of pressurized gas into the pressure chamber. A tube 90 is sealingly interposed between the bore 68 of holding member 62 and an upper opening 92 of valve chest 54, thereby isolating valve chest 54 from the vacuum zone 16 between tank 14 and outer shell 12.

The upper end of the third holding member 66 has an integrally formed, exteriorly threaded tubular portion 94 and a cap nut 96 fastened to threaded portion 94. Cap nut 96 has an aperture 97 on its top wall connected to a tubular boss 98 inside the aperture. Cap nut 96 and tubular boss 98 thus form a spring seat 100. A resilient body such as spring 102 is interposed between cap nut 96 and an annular shoulder 104 formed as a spring seat by the narrowed upper end 30 of the first rod portion 22. Spring 102 thus urges rod 20 downwardly, i.e., toward the low temperature zone side. Valve plug 52 is thereby urged into engagement with valve seat 60 to close the outlet 56. An "O" ring 106 provides an airtight seal between first holding member 62 and top wall 10 to prevent air from passing through opening 18 into the space 16 between outer shell 12 and tank 14.

The force urging valve plug 52 into engagement with valve seat 60 is adjustable by controlling the degree of the compression of the spring 102 by means of the cap nut 96. The interior of bore 72 of holding member 66 and the upper side of diaphragm 82 are in communication with the atmosphere through aperture 97.

Figure 2:
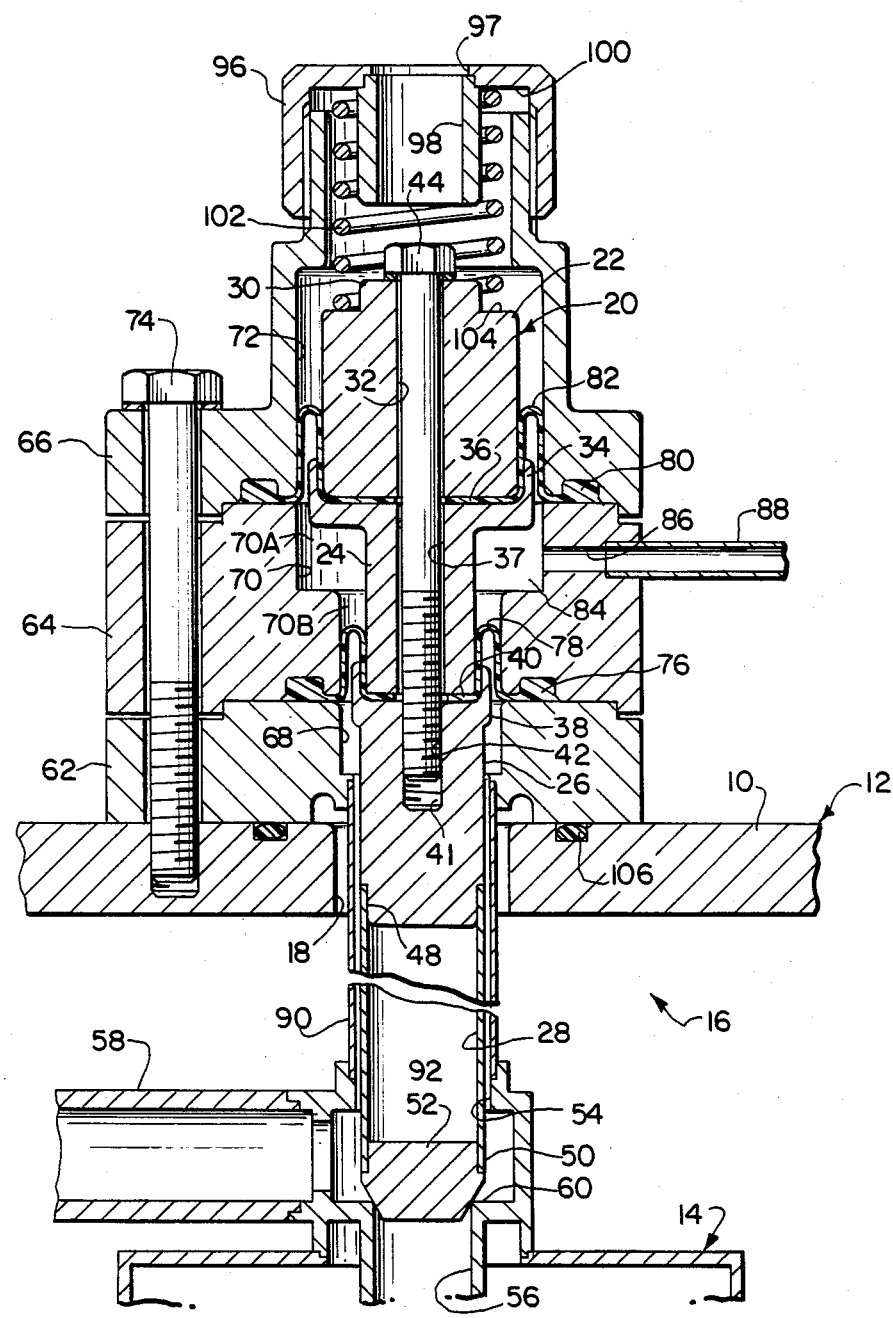
FIG. 2 is a sectional elevation of the valve of FIG. 1 taken on line II—II of FIG. 1 showing the valve in the closed position.
Figure 3:
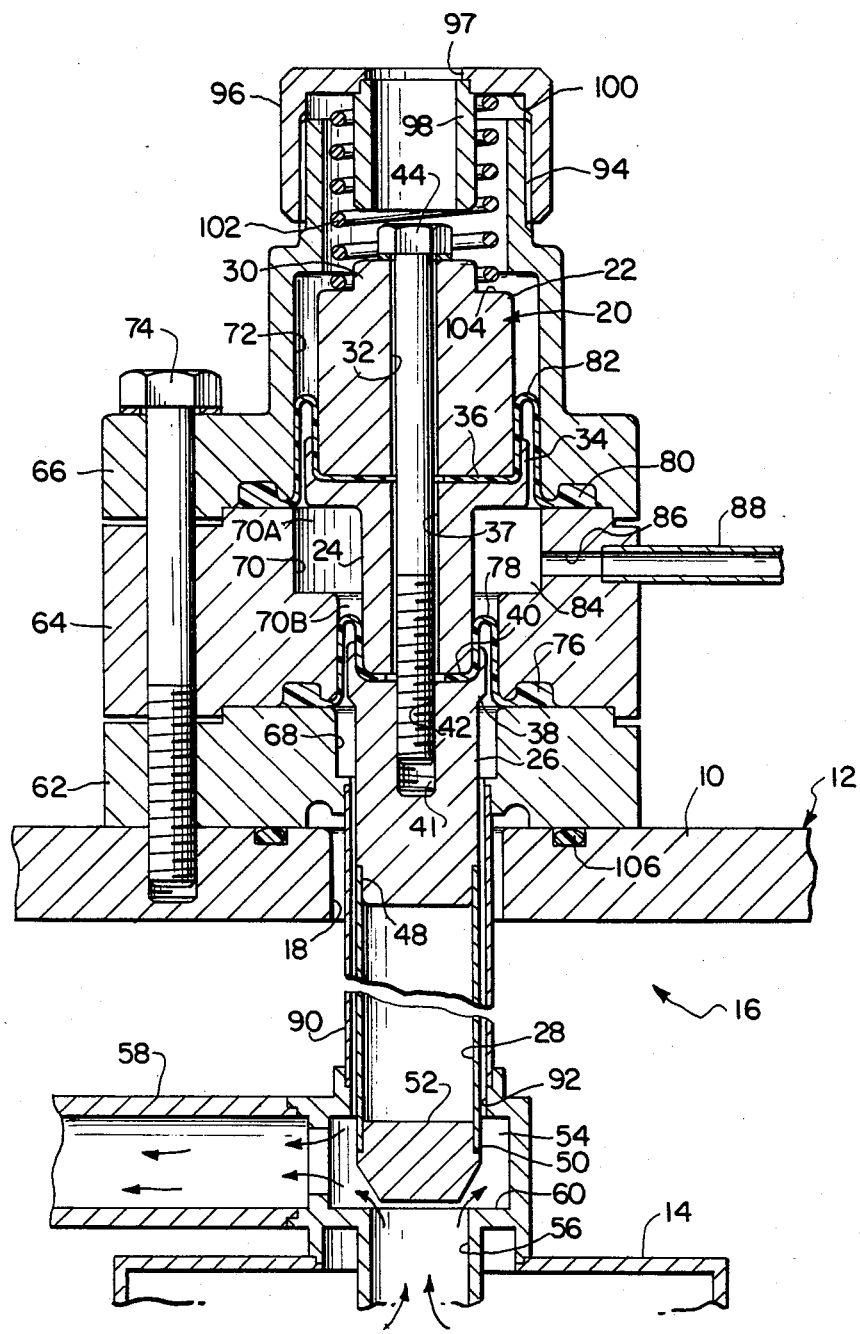
FIG. 3 is a sectional elevation corresponding to FIG. 2 except showing the valve in the open position.

The operation of the aforedescribed embodiment of the invention is as follows: Rod 20 is urged by spring 102 downwardly, as illustrated in FIG. 2, to keep the valve plug 52 normally in engagement with the valve seat 60; outlet 56 being kept closed accordingly. If an excessive pressure arises in the tank 14 and the force exerted by the pressure of the gas in the tank on valve plug 52 becomes greater than the force of spring 102, rod 20 is pushed upwardly as shown in FIG. 3, and the outlet 56 is thus opened. Gas from inside the tank 14 is vented as shown by the arrows through outlet 56 and valve chest 54 into the gas discharge passage 58. When the pressure in tank 14 decreases to a predetermined value, rod 20 and valve plug 52 are moved downwardly again by spring 102 to close the outlet 56. Thus the pressure in the inner tank 14 can be automatically maintained below a predetermined value by opening and closing the outlet 56. Since the spring 102 is located in the normal temperature zone, changes in the elasticity of the spring 102 due to low temperatures can be prevented. Cap nut 96, which is used to vary the compression of the spring, is also located in the normal temperature zone. The steady state pressure of spring 102 can thus be set easily and correctly. Consequently, the set pressure and reset pressure of the gas in tank 14 can be easily and correctly regulated. Any resilient means whose pressure is variable according to its length may be used in place of spring 102. Instead of cap nut 96, other means, such as set screws, may be used to vary the compression length of the resilient means.

Since the valve chest 54 is connected to discharge passage 58 and is sealed from the atmosphere by flexible partitions 82 and 78, it is not necessary to release the vented gas into the atmosphere.

When compressed air is introduced through inlet pipe 88 into the pressure chamber 84 by opening the control valve 89 with the outlet 56 kept normally closed as shown in FIG. 2, a high pressure is produced in the pressure chamber 84. Since top end 34 of second rod portion 24 has a larger diameter than the lower end of the second rod portion, an upward force is applied to second rod portion 24. Rod 20 is thus moved upwardly against the force of the spring 102, and outlet 56 is opened. Outlet 56 is retained in the open position unless the high pressure air in the pressure chamber 84 is discharged. Thus, the outlet 56 can be selectively opened at will by introducing compressed air into the pressure chamber 84.

The foregoing description has been set forth solely for purposes of illustration and is not intended to be limiting. Since modifications of the described embodiments incorporating the spirit and substance of the invention may occur to persons skilled in the art, the scope of the invention is to be limited solely with respect to the appended claims and equivalents.

We claim:
1. A valve mechanism for low temperature applications comprising:
an outlet for a low temperature fluid;
valve means for opening and closing said outlet;
an axially movable rod having one end secured to said valve means and the other end extending into a normal temperature zone;
means for holding said rod;
resilient means located in said normal temperature zone for urging said rod toward a position wherein said outlet is closed by said valve means and for compressing in response to pressure of said low temperature fluid against said valve means in excess of a desired pressure value to permit said rod and said valve means to be displaced to open said outlet and allow excess pressure to be released; and means for selectively applying a pressurized fluid to said rod to exert a force counter to said resilient means, whereby said rod and valve means may be displaced and said outlet opened;

said means for selectively applying a pressurized fluid to said rod comprising a pressure chamber defined by the outer surface of said rod, the inner surface of said rod holding means and first and second flexible partitions sealingly extending between said rod and said rod holding means, said pressure chamber having a larger diameter end away from said valve means sealed by said second flexible partition and a smaller diameter end toward said valve means sealed by said first flexible partition, and gas passage means for introducing a pressurized fluid into said pressure chamber;

said rod comprising first, second and third rod portions axially connected to each other, said second flexible partition being sandwiched between said first and second rod portions and said first flexible partition being sandwiched between said second and third rod portions, the end of said second rod portion oriented in the direction of the force exerted by said resilient means having a smaller diameter than the end of said second rod portion oriented in the direction counter to the direction of the force exerted by said resilient means;

said rod holding means comprising first, second and third rod holding members axially connected to each other, said first flexible partition being sandwiched between said first and second rod holding members and said second flexible partition being sandwiched between said second and third rod holding members, said second rod holding member comprising an axial through bore having a smaller diameter at its end oriented in the direction of the force exerted by said resilient means and a larger diameter at its end oriented counter to the force exerted by said resilient means.

2. A valve mechanism according to claim 1, wherein said valve mechanism is operably connected to a tank for a cryogenic fluid to open and close said tank.

3. A valve mechanism according to claim 2, wherein said tank is surrounded by a heat insulating outer shell.

4. A valve mechanism according to claim 3, wherein a vacuum is maintained between said tank and said outer shell to insulate said tank.

5. A valve mechanism according to claim 1, wherein said valve means is disposed in a valve chest having a valve seat for said valve means, said valve chest communicating with a gas discharge passage.

6. A valve mechanism according to claim 3, wherein said outlet and valve means are located inside said outer shell and said rod extends through said outer shell to the exterior thereof.

7. A valve mechanism according to claim 6, further comprising a valve chest in which said valve means is disposed, conduit means communicating between said valve chest and the exterior of said outer shell, said conduit means being sealingly joined to said valve chest and said outer shell whereby ingress of fluid into the space between said tank and said outer shell is prevented, said rod extending through said conduit means to the exterior of said outer shell.

8. A valve mechanism according to claim 1, wherein said resilient means comprises a compression spring mounted between said rod and said rod holding means.

9. A valve mechanism according to claim 8, further comprising means for adjusting the compression of said spring.

10. A valve mechanism according to claim 9, wherein said adjusting means comprises a cap nut screwed on said holding means for adjusting the compression length of said spring.

11. A valve mechanism according to claim 1, wherein the larger diameter end of said second rod portion is provided with a recess for receiving said second flexible partition and the adjacent end of said first rod portion.

12. A pressure mechanism according to claim 1, wherein said second holding member comprises said gas passage means for introducing a pressurized fluid into said pressure chamber.

13. A valve mechanism according to claim 2, wherein said rod holding means is mounted on said tank.

14. A valve mechanism according to claim 13, wherein a seal member is disposed between said rod holding means and said tank.

15. A valve mechanism according to claim 1, wherein said flexible partitions comprise elastic diaphragms.

* * * * *